UNITED STATES PATENT OFFICE 2,366,664

MONOACYL-p,p'-DIAMINODIPHENYL SULPHONES AND PROCESS OF MAKING SAME

James H. Williams, Riverside, and Richard O. Roblin, Jr., Old Greenwich, Conn., assignors to American Cyanamid Company, New York, N. Y., a corporation of Maine No Drawing. Application October 4, 1938, Serial No. 233,244

2 Claims. (Cl. 260—397.6)

This invention relates to monoacyl-p,p'-diaminodiphenyl sulphones.

The present invention is directed to a new class of chemical compounds which are effective in the treatment of infectious diseases, and particularly of streptococcus and pneumococcus infections, while being at the same time relatively non-toxic. The compounds of the present invention have the following general formula:

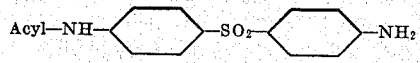

in which acyl is the acidic residue of an organic carboxylic acid.

We have found that the compounds in which R is methyl or phenyl are particularly effective therapeutically, the p-acetylamino-p'-aminodiphenyl sulphone appearing from mice tests to be practically as effective against streptococci and pneumococci as p,p'-diaminodiphenyl sulphone. This latter compound, however, is much more toxic than the monoacetylated compound of the present invention which has a low toxicity less than that of sulphanilamide, when administered subcutaneously. The invention, however, is not limited to the preferred acetyl and benzoyl compounds and in its broadest aspects covers compounds in which R is any aromatic or aliphatic residue.

We have found that while the acylation of one of the amino groups of p,p'-diaminodiphenyl sulphone, the relatively toxic therapeutic agent referred to above, lowers the toxicity of the compound without materially affecting its therapeutic activity, further acylation produces a compound which, although less toxic than the parent compound, is also much less effective against pneumococcus and the like. This surprising and unexpected result could not have been predicted from the prior art.

While the present invention is not limited to any particular process of producing the new compounds, we have found that better yields can be obtained by oxidizing a p-acylamino-p'-nitrodiphenyl sulphide to the corresponding sulphone than by obtaining the desired sulphone by reaction of p-nitrochlorbenzene with the corresponding p-acylaminobenzene sulphinic acid, as has been done in the past.

The invention will be described in greater detail in conjunction with specific examples which are typical illustrations of the invention but do not limit its scope to the details therein set forth. The parts are by weight, and in the case of water, by the corresponding volume.

EXAMPLE 1

*p-Acetylamino-p'-aminodiphenyl sulphone*

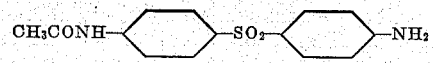

100 parts of crude p-acetylaminothiophenol (prepared by reacting chlorsulphonic acid with acetanilide and reducing the resulting p-acetylaminobenzene sulphonyl chloride with zinc and hydrochloric acid in alcoholic solution) are added to 788 parts of 95% ethanol and the solution obtained is neutralized with a solution of 36.5 parts of potassium hydroxide in ethanol. 101 parts of p-nitrobrombenzene are then added, the mixture is refluxed for about 7 hours, and water is then added to throw down the p-acetylamino-p'-nitrodiphenyl sulphide formed. The yield is from 80–90% of the theoretical.

25 parts of p-acetylamino-p'-nitrodiphenyl sulphide are added to 210 parts of glacial acetic acid and the resulting mixture is heated with agitation to 80–90° C. At this temperature, a solution of 16 parts of chromium trioxide in 100 parts of water is slowly added, the reaction mixture quickly heats to the boiling point, and the addition so regulated as to maintain rapid ebullition. When the addition is complete, the reaction mixture is poured into ice water, causing a light yellow-brown precipitate to form. This crude p-acetylamino-p'-nitrodiphenyl sulphone is washed with water until entirely free from chromium salts, dried and weighed, a yield of 28.5 parts being obtained. After crystallization from alcohol, a product having an uncorrected melting point of 224° C. is obtained.

20 parts of p-acetylamino-p'-nitrodiphenyl sulphone are added to 800 parts of water which has been acidulated by the addition of 0.5 part of glacial acetic acid. 40 parts of iron dust are then added, and the reaction mixture heated slowly with agitation to 80° C. where reduction is allowed to continue for about 24 hours. At the end of this time, the reaction mixture is neutralized with calcium carbonate and then cooled. The cooled mass is filtered and the residue extracted with ethanol. On adding water to the extract, p-acetylamino-p'-aminodiphenyl sulphone separates out as a whitish precipitate. The product is recrystallized from alcohol-water mixtures, dried and weighed, a yield of 12.5 parts being obtained. The recrystallized p-acetylamino-p'-aminodiphenyl sulphone has a melting point of 244° C.

Example 2

*p-Benzoylamino-p'-aminodiphenyl sulphone*

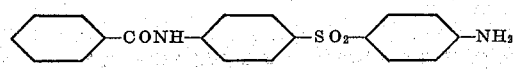

18 parts of p-acetylamino-p'-nitrodiphenyl sulphone, prepared as in Example 1, are refluxed with about 80 parts of approximately 14% hydrochloric acid for an hour, or until the solid has gone into solution. The reaction mixture is poured into water and p-amino-p'-nitrodiphenyl sulphone separates out as a yellow, rather sticky precipitate which solidifies on cooling and stirring. Sodium carbonate is added to make the solution strongly alkaline and after stirring for a few minutes, the precipitate is filtered off and dried.

5 parts of the p-amino-p'-nitrodiphenyl sulphone prepared as described above are dissolved in about 24 parts of acetone together with about 3 parts of pyridine. To this solution are then added, with constant shaking and stirring, about 2.5 parts of benzoyl chloride. After a short while, water is added to the reaction mixture and the precipitated p-benzoylamino-p'-nitrodiphenyl sulphone is filtered off. This procedure is repeated to ensure complete benzoylation of the p-amino-p'-nitrodiphenyl sulphone.

20 parts of iron dust are slowly added to about 1.6 parts of hot 5% acetic acid solution and when reaction has subsided, 10 parts of p-benzoylamino-p'-nitrodiphenyl sulphone are added, together with about 29 parts of 95% ethanol. The reaction mixture is stirred and refluxed for about 2 hours when it is neutralized with ammonia and filtered. The residue is extracted with acetone and the product recovered from the acetone by addition of water. After crystallization from an ethyl alcohol-acetone mixture, p-benzoylamino-p'-aminodiphenyl sulphone is obtained with a melting point of 256–257° C.

The above examples describe in detail the preparation of two specific compounds included in the present invention, namely, p-acetylamino-p'-aminodiphenyl sulphone and p-benzoylamino-p'-aminodiphenyl sulphone. It should be understood that other derivatives such as the formylamino, propionylamino, toluylamino, etc., can also be prepared by following the same procedure but replacing the acetyl and benzoyl components with the corresponding formyl, propionyl, toluyl, etc., compounds.

In the examples the use of p-nitrobrombenzene has been described as this compound gives materially better results than does p-nitrochlorbenzene. The latter, however, may be used although it is less desirable.

What we claim is:

1. p-Benzoylamino-p'-aminodiphenyl sulphone having the following formula:

2. Process for the manufacture of mono-benzoylated-p,p'-diamino-diphenyl-sulphone, which comprises reacting p-benzoylamino-p'-nitro-diphenyl-sulphone, with an agent capable of reducing a nitro group to an amino group.

JAMES H. WILLIAMS.
RICHARD O. ROBLIN, Jr.